UNITED STATES PATENT OFFICE 2,302,464

STYRENE POLYMERIZATION PRODUCTS AND PROCESS OF MAKING THE SAME

Robert C. Palmer, Carlisle H. Bibb, and William T. McDuffee, Jr., Pensacola, Fla., assignors to Newport Industries, Inc., Pensacola, Fla., a corporation of Delaware No Drawing. Application November 15, 1939, Serial No. 304,584

5 Claims. (Cl. 260—86)

This invention relates to styrene resins and to methods of preparing the same. More particularly, the invention pertains to the copolymerization of alpha-alkyl styrenes and styrenes not substituted in the alpha position, and to the styrene resins thus prepared.

The prior art discloses that the polymerization of styrenes not substituted in the alpha position can be induced by light, by the use of elevated temperatures and by means of catalytically active oxidizing agents, such as benzoyl-peroxide. Styrene resins produced by such polymerization are highly useful, for they are hard, tough, colorless, neutral, resistant against agents causing discoloration and other forms of deterioration, and possessed of excellent dielectric properties.

It has not heretofore been found possible, however, to induce a polymerization of alpha-alkyl styrenes in any of the foregoing manners. Apparently the resin forming reaction in the case of alpha-alkyl styrenes is impeded by the steric hindrance of the alpha-alkyl radicals.

We have now found that mixture of alpha-alkyl styrenes and styrenes not substituted in the alpha position copolymerize even in the absence of catalytic agents to yield resins having the desirable properties mentioned hereinabove.

It is therefore an important object of the present invention to provide a method of preparing styrene resins by copolymerizing alpha-alkyl styrenes and styrenes not substituted in the alpha position.

Another important object of this invention is to provide novel resins comprising copolymers of alpha-alkyl styrenes and styrenes not substituted in the alpha position.

Other and further objects of this invention will be apparent from the following description and appended claims.

The present invention comprises broadly the copolymerization of alpha-alkyl styrenes, which may also be nuclearly substituted and styrenes not substituted in the alpha position but optionally nuclearly substituted. Alpha-methyl-styrene, para-methyl-alpha-methyl-styrene, or para-iso-propyl-alpha-methyl-styrene, for instance, copolymerize with styrene, para-methyl-styrene, para-iso-propyl-styrene or other nuclearly alkyl or aryl substituted styrenes.

Differently expressed, our present invention comprises copolymerizing a styrene having a tertiary alpha carbon atom in the side chain with a styrene having a secondary alpha carbon atom in the side chain. Alpha-methyl-styrene, para-methyl-alpha-methyl-styrene and para-iso-propyl-alpha-methyl-styrene are all examples of styrenes having a tertiary alpha carbon atom in the side chain. Styrene itself, para-methyl-styrene and para-iso-propyl-styrene, on the other hand are examples of styrenes having a secondary alpha carbon atom in the side chain. Substitution in the case of a styrene having a secondary alpha carbon atom necessarily means a substitution in the ring, or a nuclear substitution; whereas in the case of a styrene having a tertiary alpha carbon atom, substitution means a substitution in the side chain.

Copolymerization of a styrene having a tertiary alpha carbon atom in the side chain with a styrene having a secondary alpha carbon atom in the side chain occurs even in the absence of catalytic agents. Mere standing at room temperature of mixtures of alpha-alkyl styrenes and styrenes not substituted in the alpha position results in the formation of resins. Elevated temperatures, light and catalytically active oxidizing agents, such as ozone and benzoyl-peroxide, accelerate the resin forming reaction.

The operative temperature range varies from room temperature up to 200° C. or even higher. The time of heating varies, more time generally being necessary for completion of the resin forming reaction when lower temperatures are used and when the styrenes being copolymerized have slower rates of reaction.

The proportions of the two classes of styrenes in a reacting mixture may be varied within wide limits. The rate of polymerization of styrenes not substituted in the alpha position being somewhat faster than copolymerization according to the present invention, mixtures of the two types of styrenes in molar proportions yield a final product comprising some unreacted alpha-alkyl styrene together with either a mixture of polymerized and copolymerized styrene resins or else a copolymerized resin made up more largely of styrenes not substituted in the alpha position to a greater extent than of alpha-alkyl styrenes. The unreacted alpha-alkyl styrenes may be distilled off, leaving a pure resin. Suitable mixtures corresponding to less than one mole of alpha-alkyl styrene to one mole of styrene not substituted in the alpha position yield hard resins containing no unreacted alpha-alkyl styrene.

In order to prepare resins derived to a greater extent from alpha-alkyl styrenes, an alpha-alkyl styrene may be heated to a moderate temperature, say, 140° C., a styrene not substituted in the alpha position added gradually over a major proportion of the time of treatment and the resinous product subjected to a final heat treatment to insure complete copolymerization.

Copolymerization according to the present invention may also be effected at atmospheric or greater pressures, in inert solvents such as xylene, para-cymene, and like solvents, having higher or lower boiling points. Copolymerization in such inert solvents yields resin solutions of varying viscosity depending on the concentration of reacting hydrocarbons and other factors.

The following examples will illustrate a few of the many possible embodiments of the principles of this invention.

Example I

A mixture of 60 parts, by weight, of styrene and 40 parts of para-methyl-alpha-methyl-styrene is heated at 140° C. for 72 hours. There is produced a hard tough resin containing practically no unreacted para-methyl-alpha-methyl-styrene. When refined styrenes are used, the resulting resin is water white.

This copolymerization proceeds even at room temperature, although at a slower rate. Benzoyl peroxide accelerates this reaction catalytically.

Example II

A mixture of 66 parts, by weight, of para-methyl-styrene and 33 parts of para-methyl-alpha-methyl-styrene is heated at 140° C. for 72 hours, to produce a hard, tough, colorless resin.

This reaction is catalyzed by peroxides such as benzoyl peroxide, of which 1 per cent is sufficient for most purposes.

Example III

A mixture of 60 parts, by weight, of styrene and 40 parts of para-methyl-alpha-methyl-styrene together with 1 per cent of benzoyl peroxide is heated for 24 hours at an average temperature of 130° C. A hard, colorless resin results.

Example IV

A mixture of 118 parts, by weight, of para-methyl-styrene and 132 parts, by weight, of para-methyl-alpha-methyl-styrene is heated at about 140° C. for 72 hours, to yield a solution of styrene resin in unreacted para-methyl-alpha-methyl-styrene. The latter may be evaporated to leave a tough colorless resin.

Example V

A mixture of 118 parts, by weight, of para-methyl-styrene and 80 parts of para-methyl-alpha-methyl-styrene is heated at about 140° C. for 72 hours, to yield a hard, tough, colorless resin containing substantially no unreacted para-methyl-alpha-methyl-styrene.

Our invention thus comprises, broadly speaking, the copolymerization of alpha-alkyl-styrenes, in particular, alpha-methyl-styrenes, and styrenes not substituted in the alpha position, as well as the styrene resins resulting from such copolymerization. The expressions "alpha-alkyl-styrene" and "alpha-methyl-styrene" as used in this application designate generically all thus alpha substituted styrenes including those also nuclearly substituted.

Copolymerization can be brought about by mixing the two classes of styrenes and simply allowing the mixture to stand for a period of time sufficient to permit the formation of a substantial amount of resin, but in order to accelerate the copolymerization, the mixture may be subjected to the action of light, heat, and oxidizing or catalytic agents, such as ozone, benzoyl-peroxide, and the like. The copolymerization may be interrupted prior to completion by distilling off or otherwise removing unreacted styrenes.

As pointed out hereinabove, various details may be varied through a wide range without departing from the principles of this invention and it is, therefore, not our purpose to limit the patent granted hereon otherwise than necessitated by the scope of the appended claims.

We claim as our invention:

1. A hard, colorless resinous product consisting of a copolymer of para-methyl-alpha-methyl-styrene and a styrene having a secondary alpha carbon atom in the side chain, the ratio of the monomers lying, respectively, between the limits, both inclusive, of 2 parts of para-methyl-alpha-methyl-styrene to 3 parts of styrene and 1 part of para-methyl-alpha-methyl-styrene to 2 parts of styrene, by weight.

2. A hard, colorless resinous product consisting of a copolymer of para-methyl-alpha-methyl-styrene and styrene, the ratio of the monomers lying, respectively, between the limits, both inclusive, of 2 parts of para-methyl-alpha-methyl-styrene to 3 parts of styrene and 1 part of para-methyl-alpha-methyl-styrene to 2 parts of styrene, by weight.

3. A hard, colorless resinous product consisting of a copolymer of para-methyl-alpha-methyl-styrene and para-methyl-styrene, the ratio of the monomers lying, respectively, between the limits, both inclusive, of 2 parts of para-methyl-alpha-methyl-styrene to 3 parts of para-methyl-styrene and 1 part of para-methyl-alpha-methyl-styrene to 2 parts of para-methyl-styrene, by weight.

4. A hard, colorless resinous product consisting of a copolymer of para-methyl-alpha-methyl-styrene and para-isopropyl-styrene, the ratio of the monomers lying, respectively, between the limits, both inclusive, of 2 parts of para-methyl-alpha-methyl-styrene to 3 parts of para-isopropyl-styrene and 1 part of para-methyl-alpha-methyl-styrene to 2 parts of para-isopropyl-styrene, by weight.

5. A hard, colorless resinous product consisting of a copolymer of para-methyl-alpha-methyl-styrene and a styrene having a secondary alpha carbon in the side chain, the ratio of the monomers lying, respectively, below the limits of 2 parts of para-methyl-alpha-methyl-styrene to 3 parts of styrene by weight.

ROBERT C. PALMER.
CARLISLE H. BIBB.
WILLIAM T. McDUFFEE, Jr.